United States Patent
Macpherson et al.

(10) Patent No.: US 11,086,656 B2
(45) Date of Patent: *Aug. 10, 2021

(54) SHARING TEMPLATES AND MULTI-INSTANCE CLOUD DEPLOYABLE APPLICATIONS

(71) Applicant: Red Hat, Inc., Raleigh, NC (US)

(72) Inventors: Dan Macpherson, Brisbane (AU); Scott Wayne Seago, Atlanta, GA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/866,021

(22) Filed: May 4, 2020

(65) Prior Publication Data
US 2020/0272503 A1    Aug. 27, 2020

Related U.S. Application Data

(63) Continuation of application No. 13/737,796, filed on Jan. 9, 2013, now Pat. No. 10,671,418.

(51) Int. Cl.
*G06F 8/61* (2018.01)
*G06F 9/455* (2018.01)

(52) U.S. Cl.
CPC ........... *G06F 9/45558* (2013.01); *G06F 8/63* (2013.01); *G06F 2009/45562* (2013.01)

(58) Field of Classification Search
CPC ............ G06F 9/45558; G06F 8/63; G06F 2009/45562
See application file for complete search history.

(56) References Cited

U.S. PATENT DOCUMENTS

| | | | |
|---|---|---|---|
| 8,108,855 B2 | 1/2012 | Dias et al. | |
| 2008/0256538 A1 | 10/2008 | Carter et al. | |
| 2009/0013162 A1 | 1/2009 | Nandan et al. | |
| 2010/0306772 A1 | 12/2010 | Arnold et al. | |
| 2011/0161952 A1* | 6/2011 | Poddar | G06F 16/583 717/173 |
| 2012/0030672 A1 | 2/2012 | Zygmuntowicz et al. | |
| 2012/0147894 A1 | 6/2012 | Mulligan et al. | |
| 2012/0198073 A1 | 8/2012 | Srikanth et al. | |
| 2013/0013781 A1 | 1/2013 | Levenshteyn et al. | |

OTHER PUBLICATIONS

Papazoglou et al. "Blueprinting the Cloud", 2011, IEEE, pp. 74-80, http://eds.a.ebscohot.com/eds/pdfviewer/pdfviewer?sid=106bc86a-26aa-4adb-b1a4-2eae5e1f2a4d%40sessionmgr4004&vid=1&hid=4113>.

* cited by examiner

*Primary Examiner* — Emerson C Puente
*Assistant Examiner* — Jonathan R Labud
(74) *Attorney, Agent, or Firm* — Womble Bond Dickinson (US) LLP

(57) ABSTRACT

A method and system determining whether the deployment has been prepared for launch on cloud. The method including receiving, by a server computer, a set of associated image templates to a template repository. The method further including receiving, in the template repository by a processing device of the server computer, a compatible deployable template that is compatible with, and distinct from, the set of associated image templates, wherein the compatible deployable template comprises information for launching the cloud server by starting the plurality of virtual machines from the plurality of virtual machine images together to create a cloud server. The method further including providing the compatible deployable.

20 Claims, 5 Drawing Sheets

SHARING TEMPLATES AND MULTI-INSTANCE CLOUD DEPLOYABLE APPLICATIONS

CROSS REFERENCE TO RELATED APPLICATIONS

This application is a continuation of U.S. patent application Ser. No. 13/737,796, filed Jan. 9, 2013, the contents of which are incorporated by reference herein.

TECHNICAL FIELD

Embodiments of the present disclosure relate to cloud computing and, more particularly, to a technique of sharing templates and deployable definitions for cloud-based applications.

BACKGROUND

Cloud computing is generally becoming the platform of choice for businesses that want to reduce operating expenses and be able to scale resources rapidly. Eased automation, flexibility, mobility, resiliency, and redundancy are several other advantages of moving resources to the cloud. Many organizations are being introduced to cloud computing by building an on-premise Infrastructure-as-a-Service (IaaS) cloud, which delivers computing, storage, and networking resources to users. Virtual machines in cloud computing are, for the most part, ephemeral. The state of a virtual machine is not persistent and is lost at shut down. A set of virtual machines can be launched with a particular configuration in a cloud one day and can be launched in a different cloud provider environment the next day. However, an administrator may not always have access to templates, for creating an image for a virtual machine or a virtual machine application, and deployable definitions, for creating an image for multiple virtual machines to be deployed as a group, that are needed for a particular configuration.

BRIEF DESCRIPTION OF THE DRAWINGS

Various embodiments of the present disclosure will be understood more fully from the detailed description given below and from the accompanying drawings of various embodiments of the disclosure.

DETAILED DESCRIPTION

Figure 1:
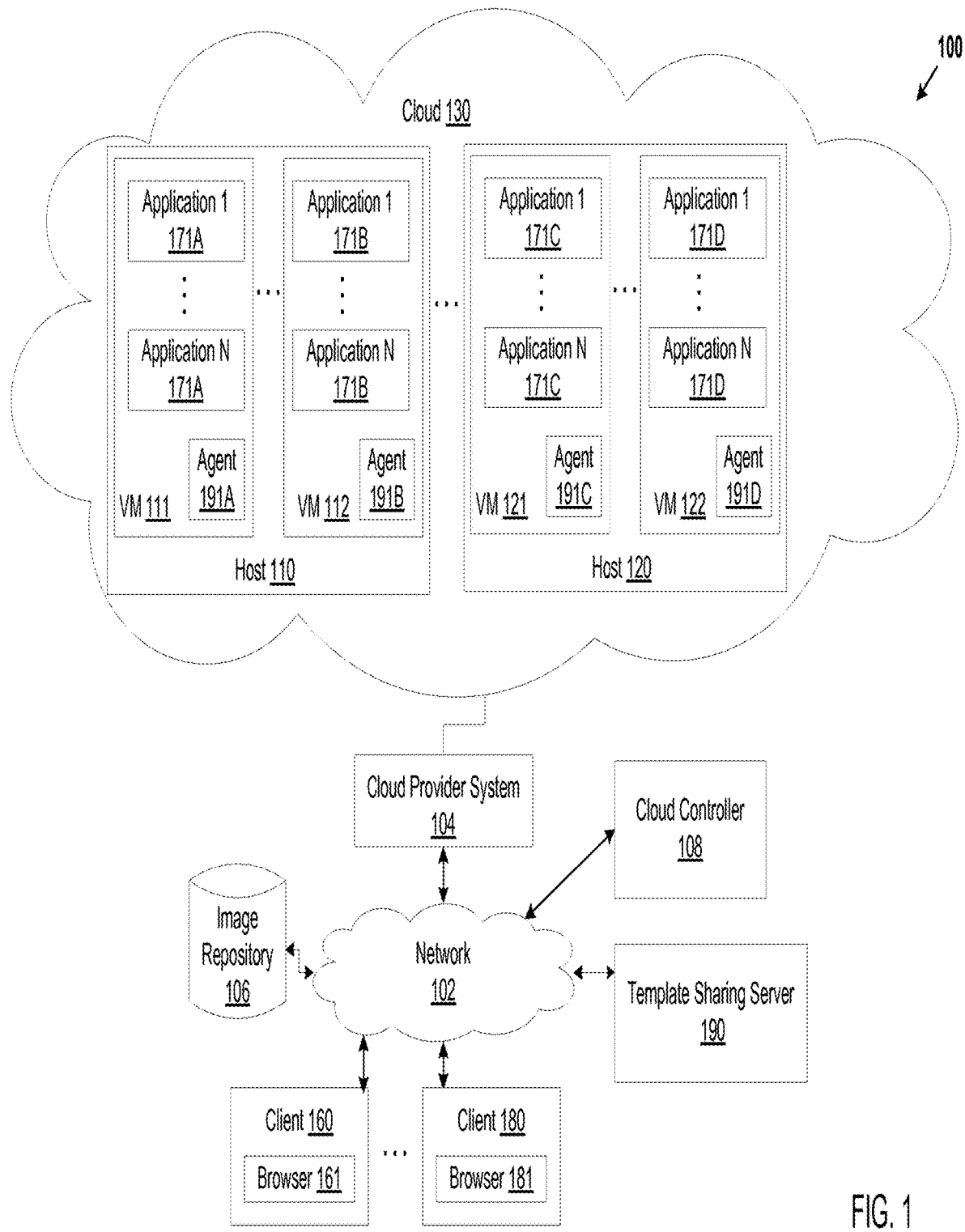
FIG. 1 illustrates exemplary system architecture, in accordance with various embodiments of the present disclosure.

Embodiments of the disclosure are directed to a method and system for sharing sets of image templates, each with a compatible deployable template, for cloud-based applications. An image template is a template for creating an image for a virtual machine or a virtual machine application. A deployable template is a template for defining the makeup and configuration for multiple virtual machines to be deployed as a group from a set of image template and additional configuration parameters. In one embodiment, one or more sets of image templates, located in a template repository, for building a cloud server image are identified. A cloud server image is a disk image used to launch a virtual machine in a particular cloud provider. Since various cloud providers have different requirements and image formats, there may be multiple cloud server images built from a given image template. For each set of image templates, a compatible deployable template, located in the template repository, for launching the cloud server image is also identified. Each set of image templates is associated with the compatible deployable template in the template repository. Upon receiving a user selection, the selected set of image templates and the compatible deployable template are obtained. prioritization, allowing one or both of a priority ranking and a probability distribution.

In one embodiment, entry of user feedback is prompted regarding the selected set of image templates and the compatible deployable template. The user feedback is received and stored in the template repository, and the user feedback is associated with the selected set of image templates and the compatible deployable template in the template repository.

In one example a user that has created one or more image templates for building a particular application and a deployable template for launching that application may want to share the image templates and the deployable template with others. The image templates and the deployable templates specified by the user may be uploaded into a template repository. Based on user input, the templates may be tagged to indicate template type and the image templates may be associated with the deployable templates to indicate that they work well together (i.e., they are compatible).

In one example, another user may be interested in building and launching a similar application. This user can search templates in the template repository to determine whether there are any templates that would be useful in building and launching the similar application. Once the user has located the desired templates, the templates can be downloaded for the user to use in building and launching the similar application. In one example, the user can customize and/or substitute the templates. The user may also enter feedback (e.g., a rating or comments for improvement) to the template repository to be associated with the selected templates.

Embodiments of the disclosure encourage users to contribute and collaborate to develop a library of useful applications for launching into a cloud.

FIG. 1 is a block diagram of a network architecture 100 for a distributed computing system, in which embodiments of the invention may operate. The network architecture 100 includes a cloud (a network of computing resources) 130 managed by a cloud provider system 104. In an embodiment, the network architecture 100 includes clouds from multiple cloud providers or hosts. The cloud 130 provides virtual machines, such as virtual machines 111, 112, 121, and 122. There can be any number of virtual machines in a cloud 130. Each virtual machine is hosted on a physical machine configured as part of the cloud 130. Such physical machines are often located in a data center. For example, virtual machines 111 and 112 are hosted on host 110 in cloud 130 provided by cloud provider 104. The cloud provider system 104 and cloud 130 may be provided as an infrastructure as a service (IaaS) layer. The cloud provider system 104 and cloud 130 may be provided by, for example, a third party cloud provider or an organization including consumers of cloud 130. Users can interact with applications executing on cloud-based virtual machines using client computer systems, such as clients 160, 180, via corresponding web browser programs 161, 181. Users may have one or more accounts associated with a cloud provider system 104.

Clients 160, 180 are connected to hosts 110, 120 and the cloud provider system 104 via a network 102, which may be may be a private network (e.g., a local area network (LAN), a wide area network (WAN), intranet, or other similar private networks) or a public network (e.g., the Internet). Each client 160, 180 may be a mobile device, a PDA, a laptop, a desktop computer, or any other computing device. Each host 110, 120 may be a server computer system, a desktop computer or any other computing device. The cloud provider system 104 may include one or more machines such as server computers, desktop computers, etc.

In one embodiment, the cloud provider system 104 is coupled to a cloud controller 108 and a template sharing server 190 via the network 102. The cloud controller 108 and template sharing server 190 may reside on the same machine or different machines (e.g., server computers, desktop computers, etc.). The cloud controller 108 and template sharing server 190 may be maintained by a cloud consumer of cloud 130, such as an enterprise (e.g., business, company). In another embodiment, the cloud controller 108 and template sharing server 190 may be maintained by a third party cloud provider. In yet another embodiment, the cloud controller 108 and/or template sharing server 190 may be part of the cloud provider system 104.

The cloud controller 108 may manage the execution of applications in the cloud 130. The cloud controller 108 may receive input, for example, from a system administrator via a client 160, 180, describing VMs 111, 112, 121, 122 to be deployed in the cloud 130 for execution of the applications. A VM may execute one or more applications. Alternatively, several VMs may be used to execute a single application (a composite application), with each virtual machine executing one or more components of a composite application. An image repository 106 can be populated with application deployment data to be used to deploy the VMs 111, 112, 121, 122. In one embodiment, the cloud controller 108 generates the application deployment data based on the user input and stores the application deployment data in the image repository 106. The repository 106 may reside locally or remotely and may represent a single data structure or multiple data structures (databases, repositories, files, etc.) residing on one or more mass storage devices, such as magnetic or optical storage based disks, solid-state drives (SSDs) or hard drives.

The application deployment data can be described in a structured format that specifies the bootable operating system, any software requirements, configuration provided or required, and any specific targeting information to instantiate a virtual machine. The application deployment data can be a hierarchy of data that includes deployables, assemblies, and templates. Each deployable describes an overview of one or more virtual machines to be deployed as a group. A deployable can describe a deployment of any number of arbitrarily large and complex deployments of virtual machines or a small number of virtual machines. For brevity and simplicity, a deployment of four virtual machines is used as an example in architecture 100. A deployable can be described by an XML file.

An assembly is a description of a virtual machine to be deployed. An assembly can be described by an XML, file. An assembly can include the description of a service to be provided by a virtual machine, the description of a service to be used by a virtual machine, and the description of one or more parameter values provided by or relied upon by a virtual machine.

An image template refers to a description of a disk image and meta-data for creating an application or virtual machine image. A virtual machine image can be created based on a template. A virtual machine image can be launched to instantiate (create) a virtual machine in a cloud. The template can be described by an XML file.

A cloud server may include one or more deployables designated to provide certain functionality. In one embodiment, the template sharing server 190 identifies a set of image templates for building a cloud server image and a compatible deployable template for launching the cloud server image in a data store, e.g., a template repository. The template sharing server associates the set of image templates with the compatible deployable template in the template repository. Upon receiving a user selection, the template sharing server 190 obtains the set of image templates and the compatible deployable template from the template repository. For example, a user may then use or customize the selected templates to build and launch a desired cloud server image.

In one embodiment, the template sharing server 190 prompts entry of user feedback regarding the set of image templates and the compatible deployable template. For example, the user feedback can include one or more ratings and/or comments (e.g., . . . ). The template sharing server 190 receives the user feedback into the template repository and associates the set of image templates and the compatible deployable template with the user feedback. Here, the creator of the templates can use the feedback to improve the templates, and other users can use the feedback to determine whether the templates would be useful for their situation.

Returning to FIG. 1, upon receiving a command identifying a specific deployable to launch, the cloud provider system 104 retrieves a reference to the existing image for each virtual machine available to be run/cloned on top of a hypervisor (not shown). If the image is not in the image repository 106, other elements of the stack may be used to place the image in the repository 106. The command may be received from the cloud controller 108 or a user (e.g., a system administrator) via a console computer or a client machine. The images can be launched in the cloud 130 to instantiate the virtual machines 111, 112, 121, 122 for the deployable. Launch of a virtual machine can include powering on or booting a virtual machine. When a virtual machine image is launched (e.g., powered-on, booted) on a host in the cloud 130, agent 191A-D executes in a corresponding virtual machine 111,112,121,122.

Figure 2:
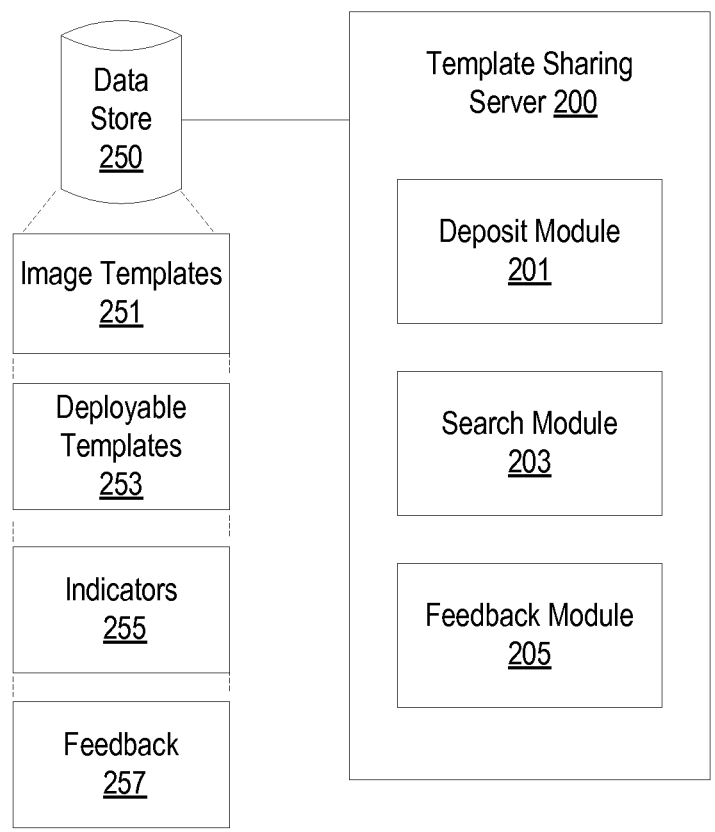
FIG. 2 is a block diagram of a template sharing server, in accordance with an embodiment.

FIG. 2 illustrates a block diagram of one embodiment of template sharing server 200. In one embodiment, the template sharing server 200 can be the same as the template sharing server 190 of FIG. 1. Template sharing server 200 includes a deposit module 201, a search module 203, and a feedback module 205. Note that in alternative embodiments, one or more of the deposit module 201, search module 203, and/or feedback module 205 may be combined into a single module. Additionally, the functionality of any of the deposit module 201, search module 203, and feedback module 205 may be divided between multiple modules.

In one embodiment, the template sharing server 200 identifies or receives (e.g., from a user) one or more sets of image templates in data store 250 (e.g., a template repository) for building a cloud server image. The template sharing server 200 also identifies or receives a compatible deployable template for each set of image templates in data store 250 for launching the cloud server image. The template sharing server 200 associates each set of image templates with the compatible deployable template in the data store

250. Upon receiving a user selection, the selected set of image templates and the compatible deployable template are obtained for download to the cloud.

In one embodiment, a deposit module 201 receives one or more sets of image templates and a compatible deployable template along with each set. For example, a user can share sets of one or more image templates with compatible deployable temples by requesting that the templates be uploaded to the template sharing server 200. The deposit module 201 then receives and stores the image templates 251 and the deployable templates 253 in the data store 250. A set of image templates can be associated with a compatible deployable template, for example, via an indicator 255. The indicator 255 may be stored with the set of image templates 251, the compatible deployable template 253, or in a separate file in the data store 250. Further, based on user input, the templates can be tagged with a template type, such as image or deployable, and/or by function, such as firewall, database server, web server, etc.

For example, for an e-commerce website, a user can specify a set of image templates 251 (e.g., a database server, a web server, and a firewall) with a compatible deployable template 253 (e.g., that describes how to launch the image templates together to create the e-commerce website), and the templates 251, 253 can be uploaded to the data store 250 via the deposit module 201. An indicator 255 can also be uploaded to the data store 250 to indicate that this set of image templates 251 works well with this deployable template 253. Additionally, based on user input, the templates 251, 253 can be tagged to indicate a function of the templates 251, 253, such as "e-commerce website," "database server," "web server" and "firewall." In one embodiment, narrative information, e.g., user instructions, can also be included with the templates regarding how to use and/or modify the templates.

In one embodiment, a search module 203 searches image templates 251 and deployable templates 253 based on search criteria to determine whether sets of image templates 251 with compatible deployable templates 253 meeting the search criteria are stored in the data store 250. The search module 203 may operate in a variety of different manners, such as keyword searching, natural language searching, ordered lists, sorting by categories, etc. If the search module 203 locates one or more sets of image templates 251 with compatible deployable templates 253 that match the search criteria, then the search module 203 provides a list of matches. The user may then select a set of image templates 251 with a compatible deployable template 253 from the list of matches, and the search module 203 obtains the set of image templates 251 with the compatible deployable template 253 for the download to the cloud.

For example, a user wants to build and launch an e-commerce site. The user may enter keyword search criteria "e-commerce website" and "firewall" into a user interface provided by the search module 203. The search module 203 searches the data store 250 for tags indicating a template is related to an e-commerce website and a firewall. If the search module 203 locates a template tagged with either "e-commerce website" or "firewall", the search module 203 also locates associated templates via an indicator 255. Once the search module 203 completes the search based on the search criteria, the search module 203 lists the sets of image templates 251 with compatible deployable templates 253 for the user, and then obtains a selected set of image templates 251 with the compatible deployable template 253 for the download to the cloud. The user can then use, and optionally customize, the selected templates to build and launch an e-commerce website.

In one embodiment, the template sharing server 200 prompts, via a user interface, the entry of user feedback 257 regarding the selected set of image templates 251 and the compatible deployable template 253. The template sharing server 200 then receives the user feedback 257 and associates it with the selected set of image templates 251 and the compatible deployable template 253 in the data store 250.

In one example, a feedback module 205 receives the user feedback 257, such as comments and/or one or more ratings, regarding the templates 251, 253. The feedback module 205 can then associate the user feedback 257 with the related templates 251, 253 in the data store 250, for example, via an indicator 255. When a user accesses a template 251, 253, the user will also be able to view user feedback 257 from other users to determine whether the template 251, 253 will be suitable for the intended use. Further, a user that created the particular template can also use the user feedback 257 to modify or improve the template.

For example, for the user that wants to build and launch an e-commerce site, the user can view the user feedback 257 associated with the various templates 251, 253 that were located in the search results. The user may be better able to select an appropriate set of image templates 251 with a compatible deployable template 253 based on the user feedback 257. Here, the user may select the top rated set of image templates 251 with a compatible deployable template 253, or the user may select a set of image templates 251 with a compatible deployable template 253 because user comments indicate that these templates are the ones best suited for the user's particular use. The user may also submit constructive comments as user feedback 257, which could be particularly helpful after the user has used the templates 251, 253 to build and launch a cloud server image.

Figure 3:
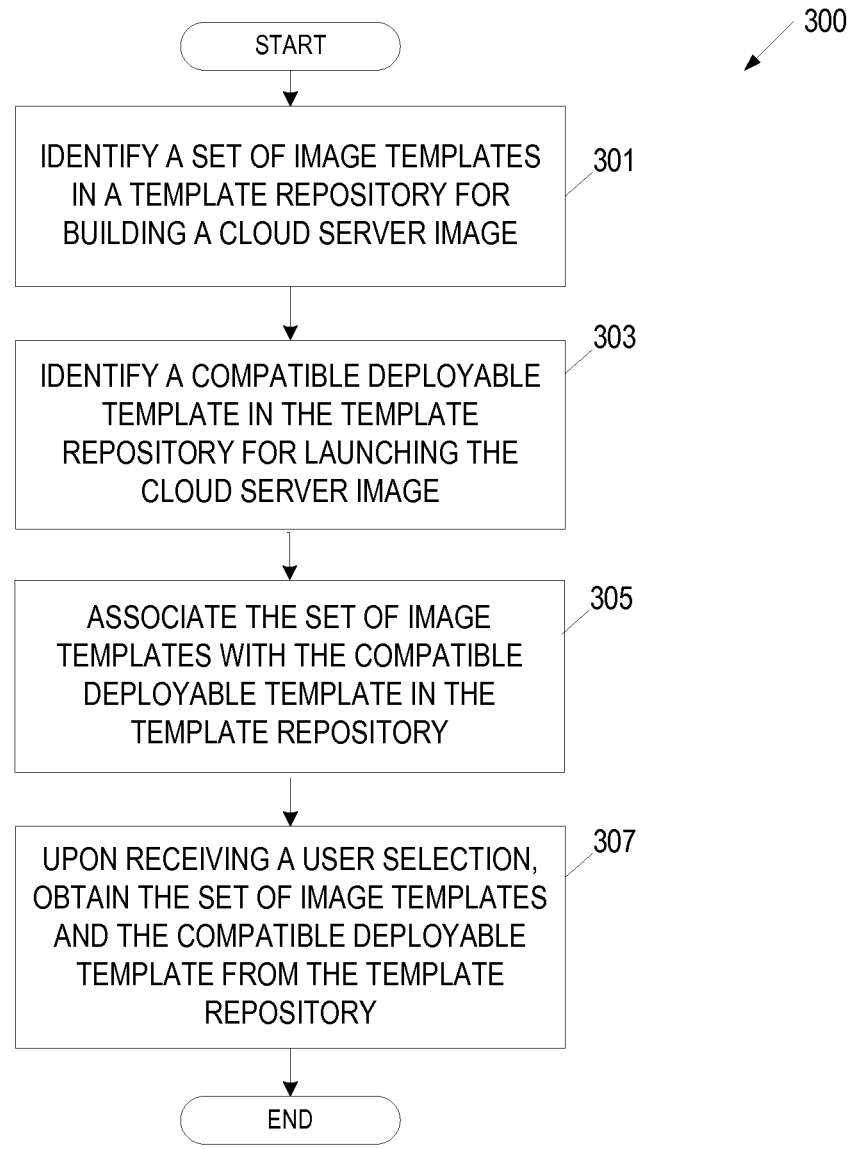
FIG. 3 is a flow diagram illustrating an embodiment of a method of template sharing.

FIG. 3 is a flow diagram of an embodiment of a method 300 for template sharing. The method 300 is performed by processing logic that may comprise hardware (circuitry, dedicated logic, etc.), software (such as is run on a general purpose computer system or a dedicated machine), or a combination of both. In one embodiment, the method 300 is performed by the template sharing server 200 of FIG. 2.

In block 301, the template sharing server 200 identifies a set of image templates 251 in data store 250, for example, a template repository, for building a cloud server image.

For example, the set of image templates 251 can be for building a particular application, such as a content management framework (e.g., Drupal) installation in a particular cloud provider (e.g., EC2) using a particular operating system (e.g., Linux). In this example, the set of image templates 251 includes a list of required software packages (e.g., Apache and Postgres). The list of packages is used by the image building system to determine what software will be installed in each built image.

In block 303, the template sharing server 200 identifies a compatible deployable template in the data store 250 for launching the cloud server image. For example, the compatible deployable template 253 can install and configure the image templates 251 to perform a useful service.

For the Drupal example above, the compatible Drupal deployable template can install and configure Drupal (e.g., via Audrey) to an instance with httpd/db. In other words, when building a cloud provider image from an image template the image building component (i.e., Audrey) will install the required software package (Drupal) and any required dependencies (httpd web server and a database system).

In block 305, the template sharing server 200 associates the set of image templates 251 with the compatible deployable template 253 in the data store 250, e.g., template repository. In one embodiment, the template sharing server 200 associates the set of image templates 251 with the compatible deployable template 253 via an indicator 255 to indicate that the deployable template 253 is compatible with the set of image templates 255.

For the Drupal example above, the template sharing server 200 can associate the Drupal image templates with the compatible Drupal deployable template, e.g, via an indicator. In one embodiment, the indicator includes data indicating an association between the Drupal image templates and the compatible Drupal deployable template.

In one embodiment, the template sharing server 200 can also associate tags with the templates 251, 253. For the Drupal example above, the template sharing server 200 can associate tags such as "Drupal," "EC2," "Fedora," "Apache," "Postgres" and "Audrey" with the templates 251, 253.

In block 307, the template sharing server 200, upon receiving a user selection, obtains the selected set of image templates 251 and the compatible deployable template 253 from the data store 250, e.g., template repository, for the user to download.

For the Drupal example above, the user wants to create a Drupal site on a standalone instance in the user's own environment (e.g., a Red Hat Enterprise Virtualization (RHEV) environment). The user can obtain the relevant templates 251, 253, and use them to build and launch Drupal on EC2. In one embodiment, the user can customize the templates 251, 253 for the user's particular application. In another embodiment, the user can substitute one or more of the templates with a different template to better optimize the templates for the user's particular application.

Figure 4:
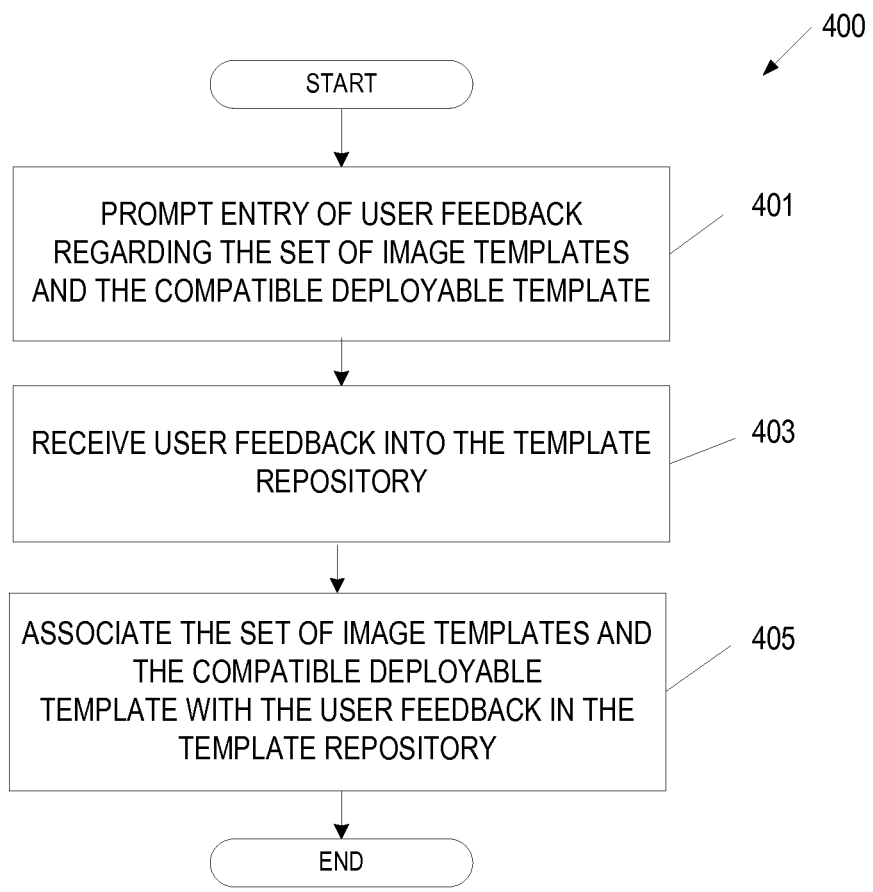
FIG. 4 is a flow diagram illustrating another embodiment of a method of template sharing.

FIG. 4 is a flow diagram of an embodiment of a method 400 for template sharing regarding user feedback. The method 400 is performed by processing logic that may comprise hardware (circuitry, dedicated logic, etc.), software (such as is run on a general purpose computer system or a dedicated machine), or a combination of both. In one embodiment, the method 400 is performed by the template sharing server 200 of FIG. 2.

In block 401, the template sharing server 200 prompts entry of user feedback 257 regarding the set of image templates 251 and the compatible deployable template 253. Here, the template sharing server 200 can provide a user interface for receiving the user feedback 257. For example, the user interface can include specific questions about the user experience with respect to the templates 251, 253 (e.g., whether templates functioned as expected, whether templates were properly tagged, etc.), a ratings scheme (e.g., rating the templates with one to five stars, or rating aspects of the templates, such as ease of customizability or usefulness, with one to five starts), and/or a comments section designed to receive narrative comments or suggestions for improvement.

For the Drupal example above, the user may give the Drupal templates four out of five stars because the user was able to successfully build and launch Drupal in a desired manner. In another example, the user may recommend including a parameter in the deployable that allows a user to input a comma-separated list of additional modules for a particular Drupal installation in the comments section.

In block 403, the template sharing server 200 receives user feedback 257 into the template repository. In block 405, the template sharing server 200 associates the set of image templates 251 and the compatible deployable template 253 with the user feedback 257 in the template repository. Once the user feedback 257 has been associated with the set of image templates 251 and the compatible deployable template 253, other users and the creator can view the user feedback 257. For example, other users can view the user feedback to better determine if the templates 251, 253 are of high enough quality or appropriate for a particular use. In another example, the creator of the templates 251, 253 can view the user feedback to determine how to improve the templates 251, 253.

For the Drupal example above, by reviewing the user feedback, a new user may choose to use particular templates 251, 253 because a previous user posted feedback that the previous user was able to successfully use the templates 251, 253 to launch and build Drupal in a situation similar to the new user's situation.

Also for the Drupal example above, the creator may choose to implement a user suggestion found in the user feedback 257 of including a parameter in the deployable that allows a user to input a comma-separated list of additional modules by modifying the templates 251, 253 and then sharing the modified templates 251, 253 via the template sharing server 200.

Figure 5:
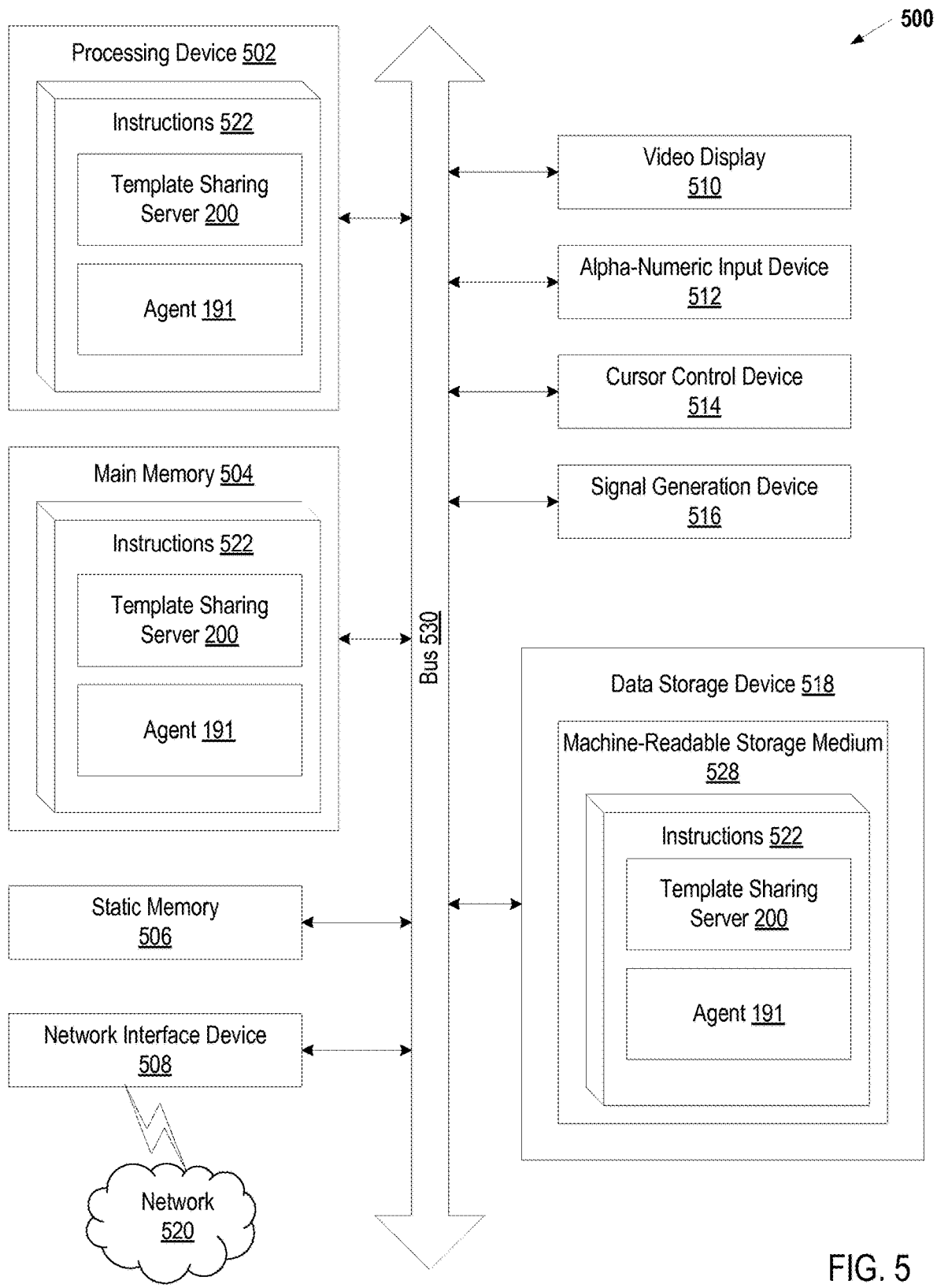
FIG. 5 is a block diagram of an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one embodiment, the instructions 522 include instructions for a template sharing server (e.g., template sharing server 200 of FIG. 2), an agent (e.g., agent 191A-D of FIG. 1) and/or a software library containing methods that call a template sharing server and/or agent. While the computer-readable storage medium 528 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "determining", "configuring", "searching", "sending," "receiving," "requesting," "providing," "generating," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, by a server computer, a set of associated image templates to a template repository, wherein the set of image templates is for building a cloud server image that comprises a plurality of virtual machine images to launch a plurality of virtual machines in a cloud provider, and wherein each of the plurality of virtual machine images is associated with an image template of the set of image templates;
receiving, in the template repository by a processing device of the server computer, a compatible deployable template that is compatible with, and distinct from, the set of associated image templates, wherein the compatible deployable template comprises information for launching the cloud server image, and wherein launching the cloud server image comprises starting the plurality of virtual machines from the plurality of virtual machine images together to create a cloud server;
providing the compatible deployable template; and
launching the cloud server image, in a configuration of the cloud provider, from the set of associated image templates and the compatible deployable template from the template repository.

2. The method of claim 1, further comprising:
associating the set of associated image templates with the compatible deployable template stored in the template repository, wherein the associating indicates that the set of associated image templates are compatible with the compatible deployable template, and wherein the compatible deployable template is additionally associated with a different set of associated image templates for building a different cloud server image;

receiving a user selection, the selection indicating the set of associated image templates and the corresponding compatible deployable template; and responsive to receiving the user selection:
obtaining the set of associated image templates and the compatible deployable template from the template repository.

3. The method of claim 2, further comprising:
associating the set of associated image templates and the compatible deployable template with user feedback.

4. The method of claim 3, wherein the user feedback comprises a rating.

5. The method of claim 3, wherein the user feedback comprises a comment.

6. The method of claim 1, wherein the image templates are customizable.

7. The method of claim 1, wherein the compatible deployable template comprises instructions for installing and configuring the set of associated image templates.

8. A system comprising:
a memory; and
a processing device operatively coupled to the memory to:
receive a set of associated image templates to a template repository, wherein the set of associated image templates is for building a cloud server image that comprises a plurality of virtual machine images to launch a plurality of virtual machines in a cloud provider, and wherein each of the plurality of virtual machine images is associated with an image template of the set of associated image templates;
receive, to the template repository, a compatible deployable template that is compatible with, and distinct from, the set of associated image templates, wherein the compatible deployable template comprises information for launching the cloud server image, and wherein launching the cloud server image comprises starting the plurality of virtual machines from the plurality of virtual machine images together to create a cloud server;
provide the compatible deployable template; and
launch the cloud server image, in a configuration of the cloud provider, from the set of associated image templates and the compatible deployable template from the template repository.

9. The system of claim 8, wherein the processing device further to:
associate the set of associated image templates with the compatible deployable template stored in the template repository, wherein the associating indicates that the set of associated image templates are compatible with the compatible deployable template, and wherein the compatible deployable template is additionally associated with a different set of associated image templates for building a different cloud server image;
receive a user selection, the selection indicating the set of associated image templates and the corresponding compatible deployable template; and
responsive to receiving the user selection:
obtain the set of associated image templates and the compatible deployable template from the template repository responsive to receiving a user selection.

10. The system of claim 9, the processing device further to:
associate the set of associated image templates and the compatible deployable template with user feedback.

11. The system of claim 10, wherein the user feedback comprises a rating.

12. The system of claim 10, wherein the user feedback comprises a comment.

13. The system of claim 8, wherein the image templates are customizable.

14. The system of claim 8, wherein the compatible deployable template installs and configures the set of associated image templates.

15. A non-transitory computer-readable storage medium including instructions that, when executed by a processing device, cause the processing device to:
receive a set of associated image templates to a template repository, wherein the set of associated image templates is for building a cloud server image that comprises a plurality of virtual machine images to launch a plurality of virtual machines in a cloud provider, and wherein each of the plurality of virtual machine images is associated with an image template of the set of associated image templates;
receive, to the template repository, a compatible deployable template that is compatible with, and distinct from, the set of associated image templates, wherein the compatible deployable template comprises information for launching the cloud server image, and wherein launching the cloud server image comprises starting the plurality of virtual machines from the plurality of virtual machine images together to create a cloud server;
provide the compatible deployable template; and
launch the cloud server image, in a configuration of the cloud provider, from the set of associated image templates and the compatible deployable template from the template repository.

16. The non-transitory computer-readable storage medium of claim 15, the processing device further to:
associate, by the processing device, the set of associated image templates with the compatible deployable template stored in the template repository, wherein the associating indicates that the set of associated image templates are compatible with the compatible deployable template, and wherein the compatible deployable template is additionally associated with a different set of associated image templates for building a different cloud server image;
receive a user selection, the selection indicating the set of associated image templates and the corresponding compatible deployable template from a plurality of sets of associated image templates and compatible deployable templates stored in the template repository; and
responsive to receiving the user selection:
obtain the set of associated image templates and the compatible deployable template from the template repository responsive to receiving a user selection.

17. The non-transitory computer-readable storage medium of claim 16, the processing device further to:
associate the set of associated image templates and the compatible deployable template with user feedback.

18. The non-transitory computer-readable storage medium of claim 17, wherein the user feedback comprises at least one of a rating or a comment.

19. The non-transitory computer-readable storage medium of claim 15, wherein the image templates are customizable.

20. The non-transitory computer-readable storage medium of claim 15, wherein the compatible deployable template installs and configures the set of associated image templates.

\* \* \* \* \*